Patented Dec. 29, 1953

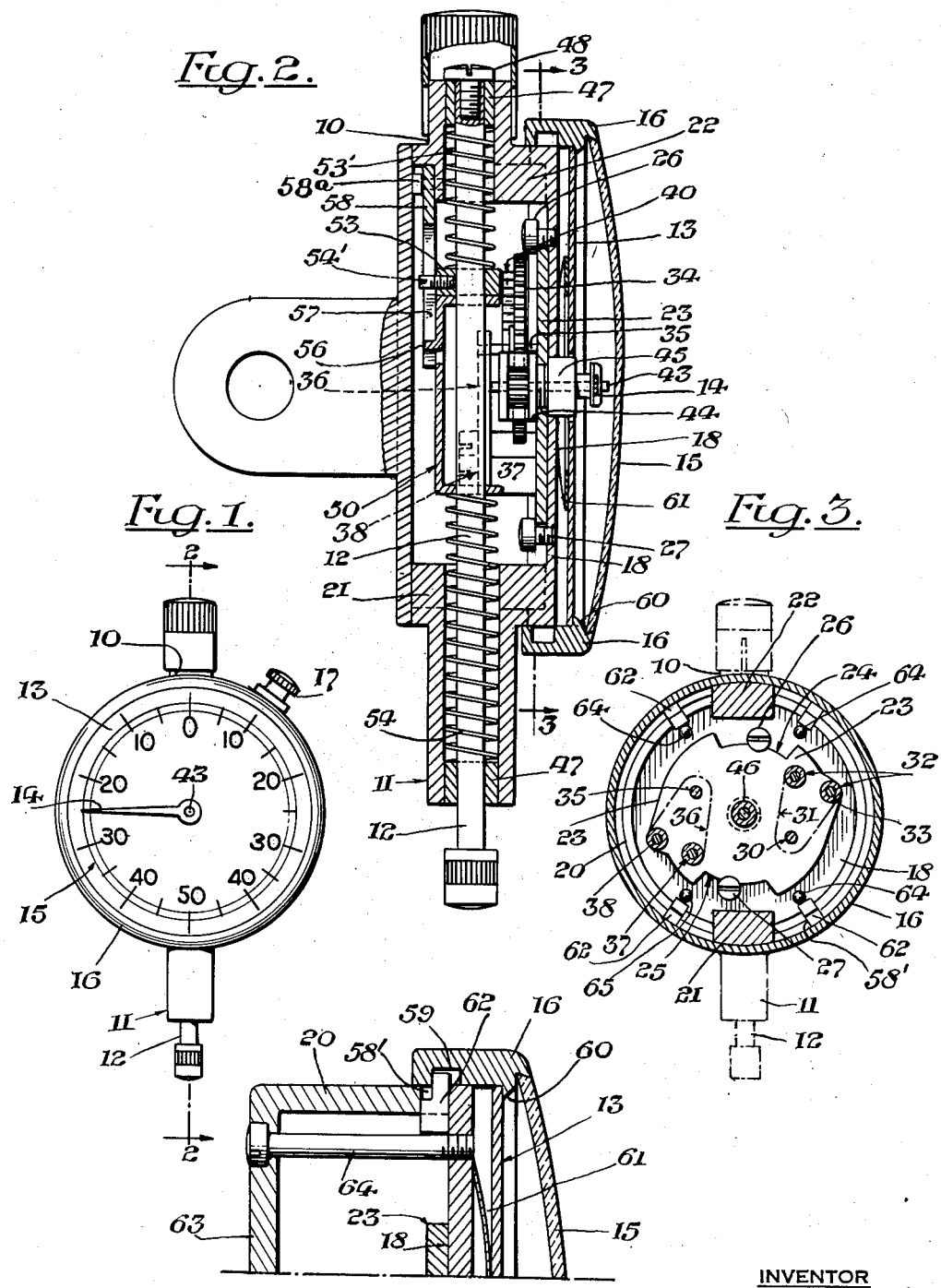

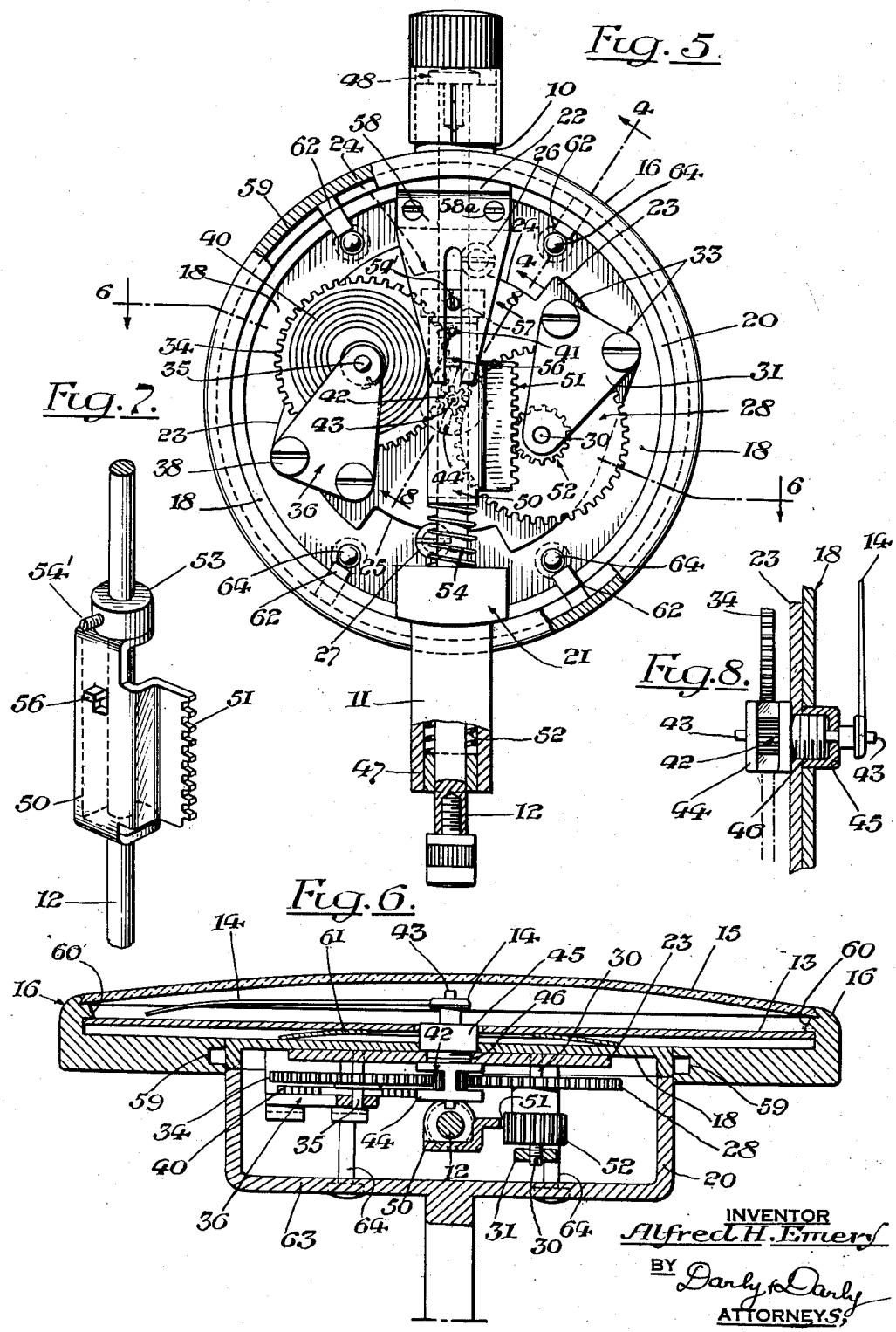

2,663,945

UNITED STATES PATENT OFFICE 2,663,945

SHOCKPROOF DIAL INDICATOR GAUGE

Alfred H. Emery, Poughkeepsie, N. Y., assignor to Standard Gage Company, Inc., Poughkeepsie, N. Y., a corporation of New York Application September 1, 1950, Serial No. 182,767

5 Claims. (Cl. 33—172)

The present invention relates to dial indicator gages of the type commonly employed to determine linear dimensions. More particularly the invention relates to a simplified construction for such a dial indicator gage, whereby the gage may be inexpensively manufactured.

More particularly the improvements consist in greater use of castings and stampings such for example as the use of a stamping in place of the rack block previously used in such constructions. Additional improvements comprise novel means for holding the bezel and crystal in place, which permit a rapid assembly of the device, thereby materially reducing the labor cost involved in the manufacture thereof.

The gage of my present invention is similar to that shown and described in my Patent No. 2,178,745, issued November 7, 1939, and as explained above, differs therefrom in novel details of construction which make it possible to manufacture the gage at a considerably lesser cost than was previously possible.

It is an object of the present invention to provide a dial indicator gage of the shockproof type having many of its parts formed as stampings and having the parts so arranged that they may be adjusted with respect to each other with a minimum of labor expenditure.

It is another object of the invention to provide a dial indicator gage having a simplified construction as respects the bearings for the various gear and pinion shafts making it possible to use longer shafts supported at their ends so that the shafts' centers need not be as accurately placed as is necessary where the bearings are located relatively short distances apart.

It is a further object of the invention to provide a dial indicator gage having novel means for attaching the dial, bezel and crystal assembly thereto, whereby the device may be more rapidly assembled and may likewise be more readily disassembled for repair or adjustment.

It is a further object of the invention to provide means for adjusting the position of the indicating hand or pointer with respect to its cooperating dial, rendering it unnecessary to remove the bezel and readjust the position of the pointer on its shaft after the indicator has been assembled.

It is a still further object of the invention to make major portions of the indicator such as the main supporting plate and the sleeve-like extensions thereof (in which the measuring plunger reciprocates) as unitary structures. By so doing, these units may be die cast at a considerable saving in both time and monetary cost.

Other objects and features of the invention will appear when the following description is considered in connection with the appended drawings, in which Figure 1 is a front elevational view of the indicator of my invention;

Figure 2 is a transverse vertical cross-sectional view of the device of Figure 1, the section being taken on the plane of the line 2—2 of Figure 1;

Figure 3 is a transverse cross-sectional view of the device of Figure 1, taken on the plane of the line 3—3 of Figure 2. In this view many of the parts are omitted in order that the shape and operation of the supporting plate for the various gears be clearly shown;

Figure 4 is a fragmentary cross-sectional view taken on the plane of line 4—4 of Figure 5 showing particularly the mode of retaining the bezel ring and its cooperating parts in position;

Figure 5 is a rear elevational view of the gage of my invention with the rear housing cover removed showing the relative position of the various operating parts of the gage when in their adjusted position;

Figure 6 is a cross-sectional view taken on the plane of the line 6—6 of Figure 5 and showing particularly the mode of utilizing a large dial and cooperating pointer;

Figure 7 is a fragmentary perspective view showing the mode of forming the rack which drives the gear train of the indicator; and Figure 8 is a fragmentary detailed cross-sectional view taken on the plane of the line 8—8 of Figure 5, and showing particularly the mode of mounting the gear supporting plate for rotation relative to the main indicator housing plate.

Referring now to the drawings, there is shown in Figure 1 the general appearance of the gage of my invention. This gage comprises a housing member or main plate which has integral therewith the tubular extensions 10 and 11, in which the measuring plunger reciprocates in the usual manner. The gage is likewise provided with a dial 13 and cooperating pointer 14 which lie beneath the crystal 15, which crystal is retained in position in the bezel ring 16. The bezel is locked in an adjusted position by means of the locking clamp and screw 17 in the usual manner.

Referring particularly to Figures 2 and 5 it will be seen that the main housing plate 18 comprises a flat plate having the upturned rim or flange 20 and two generally rectangular outwardly extending lugs or bosses 21 and 22, which bosses have integral therewith the tubular extensions 10 and 11 previously mentioned. The plate 18 thus constitutes the supporting element for all of the operating portions of the gage as will presently appear.

Referring now particularly to Figures 3 and 5, an auxiliary, shaft-supporting, plate 23 is mounted for rotation about the center of the main plate 18. Plate 23 is provided with notches 24 and 25 which limit the rotary movement of the plate 23 relative to the main plate 18 due to the use of screws 26 and 27, which are threaded into the main plate 18 and lie in the notches 24 and 25.

As stated, the plate 23 forms a support for the gear shafts of the indicator. As is clearly seen in Figures 5 and 6 the main drive gear 28 is mounted upon a shaft 30 one end of which is supported in a hole in the plate 23 and the opposite end of which is supported in a bearing hole in a supporting plate of generally triangular shape designated 31. The plate 31 is in turn supported upon and spaced from plate 23 by means of screws 33 and sleeves 32.

A back lash gear 34 mounted on a shaft 35 is supported in bearing holes in plate 23 and in a member 36 similar to the member 31. Member 36 is supported upon and spaced from the plate 23 by means of screws 38 and cooperating sleeves 37. The back lash gear 34 is provided in the usual manner with a spirally coiled spring 40, which is fixed at one end to the gear hub and at the other end to anchor 41, fixed in plate 23 (see Fig. 5).

Both the main drive gear 28 and the back lash gear 34 are in mesh with a pinion 42, which pinion is mounted on a shaft 43, which shaft carries at its opposite end the indicator pointer 14.

The construction and mounting of the pinion and its shaft can best be seen from Figure 8. The shaft 43 is supported at one end in a bearing hole in a cylindrical block 44 and adjacent the opposite end is supported in a bearing hole in a bearing cap 45. The block 44 is provided with a threaded extension 46 onto which the bearing cap 45 is threaded, as is clearly shown in Figure 8. Between the block 44 and the inner edge of the bearing cap or cup 45, the supporting plate 23 is clamped. The block 44 is milled out intermediate the ends of the main portion thereof providing slots giving access to the pinion 42, which rotates within the bearing block 44, thereby providing access for the teeth of the gears 28 and 34.

The bearing cup 45 is accurately turned to form a cylindrical exterior wall and serve as a center about which the plate 23 may be rotated with respect to the main housing plate 18, the plate 18 being provided with an accurately positioned and sized opening at the center thereof in order to cooperate with the cylindrical surface of bearing cup 45.

Due to the mounting of the plate 23 for rotation about the main plate 18 assembly is made easy. The parts can be assembled with the driving rack, hereinafter described, out of mesh with the driving pinion and therefore the tension of the back lash spring 40 can be readily adjusted and the plate 23 thereafter rotated to cause engagement of the rack and cooperating pinion while retaining the adjusted tension of spring 40.

The extensions 10 and 11 of the housing plate 18 are provided with central cylindrical bores therein as may be clearly seen by reference to Figure 2. At the outer end of each of these bores there is inserted a bushing 47 which bushings guide the measuring plunger 12 in its reciprocatory movement. The measuring plunger 12 is held in position by means of stop screw 48 in the usual manner.

Slidably mounted on the measuring plunger 12 is a U-shaped member 50, which is stamped out of a single piece of metal and which has an offset portion at the right hand side thereof, as seen in Figure 7, bearing a series of rack teeth 51 thereon. The rack teeth 51 cooperate with a pinion 52 which is mounted on the shaft 30 of the main drive gear 28.

As has been stated, the gage of the instant invention is of the shock proof type. In order to provide for this feature the plunger is urged outwardly by means of a spring 53', which extends into the bore in the upper extension 10 of the main plate 18 and seats against the bushing 47. This spring bears against a collar 53, adjustably fixed by means of the setscrew 54' to the plunger 12. A compression spring 54 of lesser resiliency is seated in the lower extension 11 of the main plate 18 against the lower bushing 47 and bears against the lower portion of the U-shaped member 50. Due to this arrangement a shock imparted to the plunger is absorbed and is not transmitted to the gear train since, if collar 53 is moved very rapidly, it merely moves away from the upper end of the U-shaped rack member 50, permitting the rack member to follow under pressure of its spring 54.

As is clearly seen in Figure 7, the rack member has struck up therefrom a lug or projection 56. As is also seen from Figure 7, the setscrew 54' protrudes considerably beyond the periphery of the collar 53. The two elements just mentioned are guided in a slot 57 in a bridge member 58, which member is supported by any suitable means, as for example, by screws 58a upon the rectangular portion of the upper housing extension 10. The lug 56 thus serves to prevent any rotation of the rack member 50 about the measuring plunger and in a like manner the setscrew 54' prevents any rotation of the measuring plunger 12.

It should be noted at this point that the stop screw 48 is provided with a slot in the stem thereof to make it a tight fit in the threaded upper bore of plunger 12, so that the rest position of the plunger 12 may be readily adjusted. This serves an important function in the assembly of the device. The indicator hand 14 may be placed in the nine o'clock position as indicated at Figure 1, and may be maintained in that position by adjustment of the screw 48. Were this screw not slotted and not frictionally engaged with the cooperating threads of the plunger, it would be necessary to remove the crystal and bezel ring from the instrument and remove the indicator hand from its shaft 43 and replace it in order to achieve the desired nine o'clock position.

In prior construction of gages of this type the bezel ring was held in position by screws which extended through a ring which lay in a groove in the interior of the rim of the bezel and which screws could be removed by inserting a screw driver through a hole in the bezel rim. This involved considerable time since a single hole was provided in the rim of the bezel, which had to be aligned with each of the interior rim fastening screws successively in order that those screws be removed.

In the present device I have improved the mounting of the bezel ring and have made it possible to fix the ring and the crystal carried thereby in position without waste of time. My present construction is best shown in Figures 4 and 6. As will be seen in those figures, the bezel ring 16 carries the crystal 15 in the usual manner. The bezel ring is provided with an inwardly facing peripheral groove 59, which groove is in alignment with a plurality of slots 58' in the flange 20 of the main frame 18. The bezel ring has an inwardly projecting flange 60, against which the dial 13 seats, the dial being pressed against the flange 60 by means of the usual spring plate 61.

Locking keys 62 extend through the notches 58' of the flange 20 of main plate 18 and into the above mentioned peripheral groove 59. The tension of the spring plate 61 causes the left hand edge of the groove 59 to bear against each of the locking keys 62 and tends to retain these keys in position. However, in order to assure that the keys will not move inwardly, thereby releasing the bezel ring from the main plate, the device is so constructed that the housing cover 63 (see Figures 4 and 6) is fastened to the main frame plate 18 by means of screws 64, which screws are located immediately behind the locking keys 62. Therefore the keys are prevented from moving inwardly and retain the bezel ring and unitary crystal as well as the dial in position at all times.

As is well known, gages of this type are made in two standard dimensions, which dimensions are specified by the American Gage Society. One class of gages is similar to that already described. Another is identical therewith except for the fact that the dial and its cooperating indicating hand have a greater diameter which serves to provide greater spacing between adjacent graduations on the dial. In order that the same operating mechanisms may be provided for the two standard sizes of gage, it is desirable that the dial bezels and crystals be interchangeable.

In Figure 6 I have shown a mode in which the same operating mechanisms including the same main plate 18 may be utilized while providing the larger size dial and cooperating indicator hand. This is accomplished by merely providing a bezel ring which has an inwardly extending peripheral flange thereon, which flange is in turn provided with the inwardly facing peripheral groove 59, identical with that described above in connection with Figure 4. It will therefore be seen that the same operating elements may be utilized with dials of different sizes by simply changing the bezel ring and crystal assembly and of course providing a pointer of proper length to cooperate with the particular dial.

While I have described a preferred embodiment of my invention it will be understood that other forms thereof may readily be devised within the scope of the invention. I wish therefore to be limited not by the foregoing description, but on the contrary solely by the claims granted to me.

What is claimed is:

1. In a dial indicator gage having a supporting plate with a central opening therein, and a driven pinion and driving and backlash gears mounted on the plate, an improved mounting for the driven pinion comprising a generally cylindrical block having a reduced externally threaded extension, a shaft mounted substantially coaxially of said block and extension in a bore in said block, said extension extending through the central opening in the supporting plate, and a cap threaded on said block extension and clamping said block in position on said plate.

2. A device as claimed in claim 1, characterized in that a transverse opening is provided in said cylindrical block and the driven pinion is mounted on said shaft within said opening, the driven pinion being thus exposed for meshing with the driving and backlash gears.

3. A device as claimed in claim 2, characterized in that an indicating hand is mounted on the end of said shaft remote from the driven pinion.

4. In a dial indicator gage having a main body plate with a central opening therein, driving and backlash control gears, a dial, an indicator hand rotatable with respect to the dial, and a pinion driven by the driving gear and driving the hand, an improved mounting for the gears, pinion and indicator hand, comprising an auxiliary plate on which said gears are mounted, a cylindrical block, a shaft mounted coaxially in a bore in said block, a pinion on said shaft meshing with the driving and backlash control gears, said block being cut away to permit such meshing, the indicator hand being fixed to said shaft at the end opposite said pinion, a threaded extension on the end of said block opposite said pinion, a cap threaded on said extension and clamping said auxiliary plate between said block and said cap, said cap extending through the central opening in the main body plate whereby said auxiliary plate may be rotated with respect to the main body plate while retaining the drive and backlash gears in mesh with the driven pinion.

5. An improvement as claimed in claim 4, characterized in that said cap is provided with a central opening aligned with the bore in said cylindrical block and said shaft is rotatably supported in said bore and said opening.

ALFRED H. EMERY.

References Cited in the file of this patent

UNITED STATES PATENTS

| Number | Name | Date |
|---|---|---|
| 1,314,888 | Mitchell | Sept. 2, 1919 |
| 1,617,485 | Hughes | Feb. 15, 1927 |
| 2,134,093 | Ames | Oct. 25, 1938 |
| 2,178,745 | Emery | Nov. 7, 1939 |
| 2,206,437 | Tracy | July 2, 1940 |
| 2,336,695 | Maurer | Dec. 14, 1943 |
| 2,484,770 | Worthen | Oct. 11, 1949 |
| 2,484,771 | Worthen | Oct. 11, 1949 |